United States Patent
Barabas et al.

(10) Patent No.: US 12,368,935 B2
(45) Date of Patent: Jul. 22, 2025

(54) METHODS AND SYSTEMS FOR TEXT-TO-SPEECH SCREEN READING

(71) Applicant: Pluto Inc., West Hollywood, CA (US)

(72) Inventors: Ariel Alejandro Barabas, Caba (AR); Jacob Acosta, Culver City, CA (US)

(73) Assignee: Pluto Inc., West Hollywood, CA (US)

( * ) Notice: Subject to any disclaimer, the term of this patent is extended or adjusted under 35 U.S.C. 154(b) by 87 days.

(21) Appl. No.: 18/066,062

(22) Filed: Dec. 14, 2022

(65) Prior Publication Data

US 2024/0205514 A1    Jun. 20, 2024

(51) Int. Cl.
H04N 21/81    (2011.01)
H04N 21/45    (2011.01)
H04N 21/47    (2011.01)

(52) U.S. Cl.
CPC ..... H04N 21/8166 (2013.01); *H04N 21/4516* (2013.01); *H04N 21/47* (2013.01)

(58) Field of Classification Search
CPC . H04N 21/8166; H04N 21/4516; H04N 21/47
See application file for complete search history.

(56) References Cited

U.S. PATENT DOCUMENTS

2011/0197124 A1    8/2011  Garaventa
2016/0210127 A1*   7/2016  Subashchandrabose ..................... G06F 8/658
2016/0291952 A1*   10/2016 Velasco ................... H04L 67/10
2018/0088762 A1*   3/2018  Hausler .................. G06F 3/0486
2018/0329581 A1*   11/2018 Liu ........................ G06F 16/957
2020/0142570 A1    5/2020  Ryman et al.
2020/0304972 A1    9/2020  Gross et al.
2021/0027762 A1    1/2021  Arik et al.
2022/0366131 A1*   11/2022 Ekron ................... G06F 16/951

OTHER PUBLICATIONS

"Accessible Rich Internet Applications (AWI-ARIA) 1.1," retrieved from the internet on Feb. 6, 2023, from url: https://www.w3.org/TR/2017/REC-wai-aria-1.1-20171214/, dated Dec. 14, 2017, in 199 pages.

* cited by examiner

*Primary Examiner* — John W Miller
*Assistant Examiner* — Akshay Doshi
(74) *Attorney, Agent, or Firm* — Knobbe, Martens, Olson & Bear LLP

(57) ABSTRACT

An aspect of the disclosure related to methods and systems configured to access connected device data from a connected device, the connected device data comprising a manufacturer identifier, a model identifier, an identifier of a year of manufacturer, browser type, and/or browser release/version. Using the connected device data, a version of code is selected comprising interpreter code configured to provide the connected device with accessibility functionality in accordance with a specification attributes and roles that enables enhanced screen reader functionality that the connected device is natively lacking. The selected version of the code is downloaded to the connected device, wherein the selected version of the code is configured to enable the connected device to generate enhanced audible announcements relative to announcements that the connected device would natively provide.

21 Claims, 12 Drawing Sheets

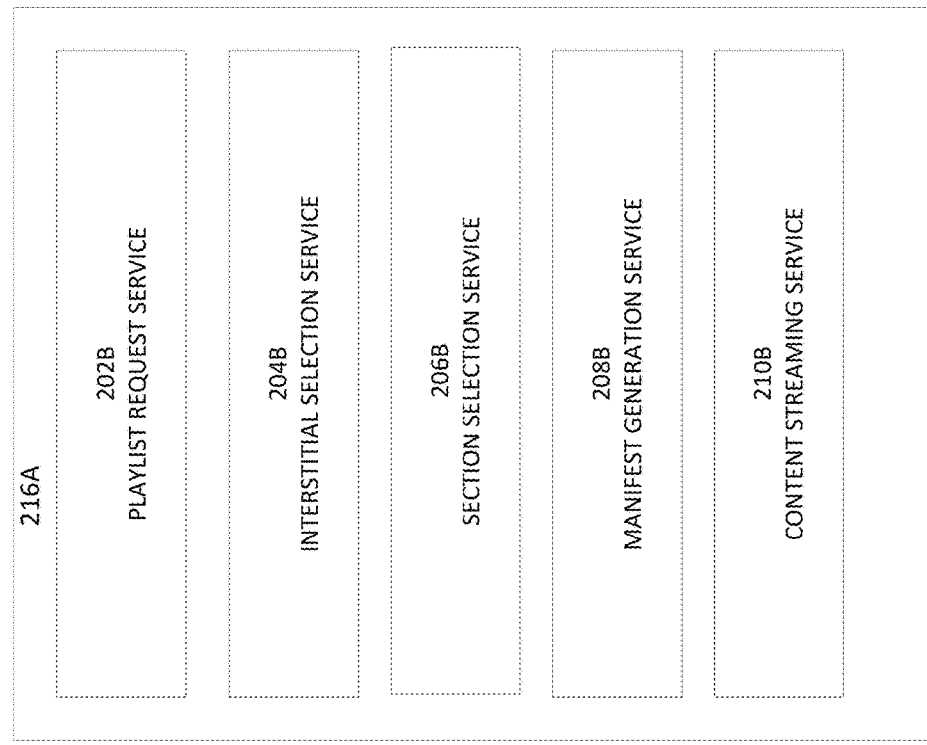

METHODS AND SYSTEMS FOR TEXT-TO-SPEECH SCREEN READING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention is related to assistive technologies for content display devices, and in particular to text-to-speech screen readers.

Description of the Related Art

In order to provide users that may be differently abled with the ability to use modern technologies, such as streaming media and media reproduction devices, assistive functionality has been made available. However, many legacy devices, such as older connected televisions and other devices used to reproduce content, such as streaming content, and even many new content reproduction devices, lack such assistive technologies. For example, smart networked televisions may not natively support some or all of the desired screen reader functionality which may be critical in enabling certain users with vision issues to navigate menus, controls, and keyboards displayed by a device.

BRIEF DESCRIPTION OF THE DRAWINGS

FIG. 2B illustrates example modules and services of the content composer and streaming system.

FIG. 2D illustrates example modules and services of the content reproduction system.

Figure 1:
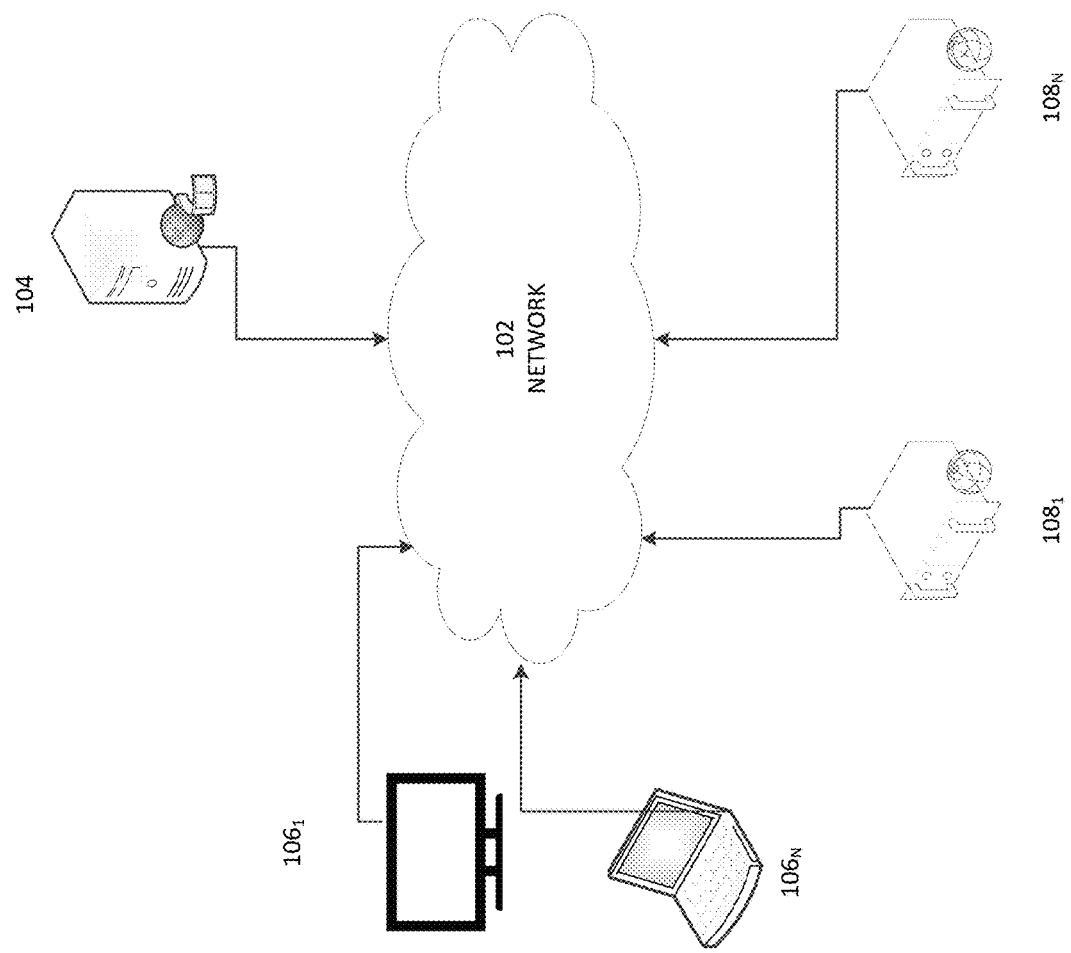
FIG. 1 illustrates an example environment.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

Methods and systems are described that are configured to provide assistive technology to content reproduction devices, such as smart televisions, laptops, tablets, desktop computers, smart phones, and the like, that lack such assistive technology or that do not provide sufficient support for such assistive technology and assistive technology standards.

Accessibility for those differently-abled to online services, such as streaming media and/or other services utilizing user interfaces, and to devices, such as connected televisions, that are used to receive and reproduce such streaming media and user interfaces have become recognized as being of high importance. However, many legacy reproduction devices (e.g., connected televisions), and even many new content reproduction devices, do not support accessibility standards and technologies, such as those that provide assistive technology agents (e.g. screen-readers that provide text-to-speech functionality and that may use text tags to convey information on a display, such as text and text alternatives for images, and functions such as links, buttons, menus, sliders, and other navigation and control interfaces). An example of such an assistive technology specification is the Accessible Rich Internet Applications (ARIA), which comprises a set of roles and attributes that define ways to make HTML content and applications more accessible to people with disabilities.

Although many newer browsers and other devices that utilize HTML documents have built-in functionality to perform screen reading, many older browsers and user interface applications (including those used on smart televisions and other content reproduction devices) do not. Screen reading is more than just reading text displayed on a screen, it actually enables a user to navigate controls (e.g., links, menus, sliders, buttons, etc.) via touch inputs (e.g., on a dedicated remote control or phone) or via voice commands, and to respond to error messages. Ideally, a screen reader may provide non-sighted users with a user experience that parallels that of a sighted user. The disclosed systems, methods, and technologies enable users to be provided a highly consistent screen reader experience across devices. Thus, for example, a connected/smart TV built in 2015 may be configured using the disclosed technology to provide a user-experience similar to that of a modern laptop browser that frequently receives software updates that include advances in screen reader technology. Further, the disclosed technology may be quickly updated to support changes (e.g., new functionality) in accessibility specifications (e.g., changes in the ARIA specification) to enable consistency across devices for users.

It is understood that for the sake of clarity, reference may be made to the ARIA specification, the disclosed technology may be utilized with other assistive technology standards and specifications. It is also understood, while certain ARIA roles and attributes may be discussed by way of illustrative example, the disclosed systems and methods may be utilized with all current and future ARIA roles and attributes, or any subset thereof. As discussed above, ARIA comprises roles and attributes that define ways to make web/HTML content and web/HTML applications (e.g., those developed using JavaScript, Python, or the like) more accessible to people with disabilities, such as those that have vision deficits. ARIA supplements HTML (hypertext markup language) so that interactions and widgets used in applications can be passed to assistive technologies. By way of illustration, ARIA enables accessible widgets (e.g., JavaScript widgets), forms hints and error messages, and enables live content update. ARIA attributes can be added directly to the markup language or to a given element, and can be updated dynamically (e.g., using JavaScript code, Python code, or the like). As similarly noted elsewhere herein, certain devices, browsers or other applications, may not support ARIA at all or may only partially support ARIA roles, or may misreport certain functionality.

ARIA defines semantics that can be applied to elements having respective roles (defining a type of user interface element) as well as states and properties that are supported by a role. An author may assign an ARIA role, and corresponding states and properties, to an element, or the element may already have the appropriate ARIA semantics (via use of an appropriate HTML element). The addition of ARIA semantics exposes additional information to a browser's or the like accessibility application programmer interface (API).

Conventional approaches to overcoming the lack of accessibility standards support, such as support for ARIA, are memory intensive, require significant processor resources, large amounts of custom logic, and are slow and error prone, providing a poor user experience.

For example, conventional approaches may require that the selected content in state be constantly tracked, which is a memory intensive process. Manually customized logic, and processor resources to execute such custom logic, may be required for respective media reproduction devices (e.g., connected televisions) and their respective browsers or other HTML rendering applications to manage queued speech content with respect to screen reader operations. Further, with respect to streaming media, a streaming media application may need to utilize antipatterns to define objects whose sole purpose is to pass information to another object to manage the text-to-speech process.

Systems, methods, and technologies are described to overcome the technical problems of conventional approaches in providing assistive technologies, such as screen reader technologies, where the displayed content and/or tags are read (e.g., associated with controls, such as buttons, menu selections, and the like), and certain content is read to the user as speech so that the user does not have to read such content. Such screen reader technology enables those that have difficulty reading controls (e.g., due to vision issues or cognitive issues) to be able to navigate the controls of the content reproduction device (or other user interfaces) and to stream or otherwise access media content (e.g., video content, audio only content, text content, other content, and/or any combination thereof), while reducing memory and processor utilization and reducing or eliminating the need for error prone, custom logic.

Typically, on a content reproduction device (e.g., a connected television, laptop, smartphone, gaming console, or some combination thereof), a user may activate a voice guide feature or the voice guide feature may be activated by default. A text-to-speech (TTS) engine may then read HTML elements on the application screen.

For example, an author may provide live region markup as hints, which may be used by the assistive technology in providing text-to-speech.

The technology used to provide accessibility features to legacy products, and other content reproduction devices lacking adequate accessibility features, and to enable such products to act as if they fully support ARIA, or other accessibility standard or specification, may optionally be implemented as a component, such as an interpreter component (e.g., a React component (a function or class that accepts an input and returns a React element)). A React element is an object that describes a DOM node and its attributes or properties. The component may be configured to provide the missing accessibility functionality to older devices (e.g., with respect to screen reader functionality). The component may be configured as a cross-platform component, usable on different models of media content reproduction devices from different manufactures, in a manner transparent to developers. The component may be referred to at times as an interpreter component or code. Although reference is made to React, other frameworks may be used, such as by way of example, Vue or Angular frameworks.

As will be described with reference to the figures, the interpreter component may read ARIA properties associated with user interface elements, understand what is being displayed on screen to a user, and may then interpret associated text (e.g., displayed text or descriptive text, such as may be associated with a control, such as a button, slider, menu, link, or the like), place the corresponding text in a queue, and enable the text to be converted to audible speech by the reproduction device (e.g., via a speaker). Thus, the interpreter component brings screen reader capabilities to devices that do not natively support such capabilities or that only support a subset of screen reader functionality. Where a device supports certain text-to-speech assistive features, but not others, the disclosed technology enables developers to just fill in the gaps so that the interpreter component enables the missing features. The disclosed technology enables developers of applications for devices to treat the devices as being fully ARIA compliant using recommended practices of accessibility standards, even though the devices may not be natively compliant.

Further, although the ARIA specification may be updated with new functionality, preexisting devices that support older versions of the ARIA specification typically are not updated to support such new functionality. Advantageously, because the reader enhancement interpreter component configured to add accessibility functionality may be updated to include the new ARIA functionality, and the updated reader enhancement interpreter component may be pushed to or requested via user devices.

ARIA will now be described in greater detail to provide context for certain examples described herein.

ARIA defines semantics that can be applied to elements, with the elements divided into roles (defining a type of user interface element), and states and properties that are supported by a role. An author assigns an ARIA role, and corresponding states and properties, to an element during its life-cycle, or the element may already have the appropriate ARIA semantics (via use of an appropriate HTML element). The addition of ARIA semantics exposes additional information to a browser's accessibility application programmer interface (API).

Example widget roles may include: button (where the button role identifies an element as a button to the screen reader, and where a button is a widget used to perform actions), checkbox, gridcell, link, menuitem, menuitemcheckbox, menuitemradio, option, progressbar, radio, scrollbar, searchbox, separator (when focusable), slider, spinbutton, switch, tab, tabpanel, textbox, and treeitem. Example live region roles may include: alert, log, marquee, status, and timer. There may also be associated composite roles, document structure roles, landmark roles, and the like.

A given widget may be associated with attributes, such as: aria-autocomplete, aria-checked (indicating the current "checked" state of checkboxes, radio buttons, and other widgets), aria-current, aria-disabled, aria-errormessage, aria-pressed, aria-readonly, aria-selected, aria-valuemax, aria-valuemin, aria-valuenow, aria-valuetext, etc. Example live region attributes may include: aria-live, aria-relevant, aria-atomic, aria-busy, etc. Example relationship attributes may include: aria-activedescendant, aria-colcount, aria-colindex, aria-colspan, aria-controls, aria-describedby (which lists the ids of the elements that describe the object and may be used to establish a relationship between widgets or groups and the text that describes them), aria-details, aria-errormessage, etc.

The interpreter component may build text for the content reproduction device based on what control or other element is currently focused (e.g., highlighted) on the content reproduction device. The highlighting may have been in response to the user navigating to the element (e.g., using a remote control) or by the content reproduction device automatically highlighting the element. However, as described herein, the interpreter does not merely read focused element text.

The interpreter component may further perform queue management and prioritization management (e.g., a notification that appears may have higher priority than focused element). For example, the interpreter component may add items to the text-to-speech queue based on their politeness level from the aria-live property or role inheritance and override current spoken text to alert users of higher-priority events.

In particular, in ARIA, a live region may be explicitly denoted using the aria-live attribute. The aria-live attribute is used to set the priority with which screen reader should treat updates to live regions (off, polite, or assertive). The default setting may be "off". For example, a region which receives updates that are important, but not critical, for the user to receive may optionally be assigned the "polite" attribute. The screen reader function may be configured to speak "polite" changes when the user is idle (e.g., after a current voice announcement is finished). A region which receives time-sensitive/critical notifications that need the user's immediate attention may be assigned the "assertive" attribute. For example, a change to an assertive live region may interrupt another announcement a screen reader is currently making. Thus, the interpreter component may utilize the aria-live attribute and/or time in determining how to prioritize text-to-speech actions and how to manage the queue (e.g., assertive items clear polite items from the queue). For example, a notification associated with an assertive attribute may be granted priority over a notification with a polite attribute, and notifications with the same politeness level may be prioritized based on time, where the notifications are presented in the order of what occurred first.

The aria-activedescendant property enables the focus for assistive technologies on interactive elements to be managed when such interactive elements contain multiple focusable descendants (e.g., toolbars, menus, grids, and/or the like), and may be used with respect to composite widgets, groups, textboxes, or applications whose id is referenced as an attribute value. The aria-activedescendant property may be used on container elements to refer to the currently active element, informing assistive technology users of the currently active element when focused. For example, this technique may ensure that assistive technology can gather information about the current active child of a composite widget by setting the aria-activedescendant attribute of a relevant element.

With aria-activedescendant, the browser maintains the Document Object Model (DOM) focus on the container element or on an input element that controls the container element. Advantageously, the user agent communicates desktop focus events and states to the assistive technology as if the element referenced by aria-activedescendant has focus.

The actual changing of focus and management of attributes value may be accomplished using JavaScript, Python, or the like.

Certain example aspects will now be discussed with reference to the figures. It is understood that although certain example uses of the disclosed interpreter component described herein may be with reference to streaming services, the use of the interpreter component is not so limited. For example, the interpreter component may be used without content provision services (e.g., content download services), and may generally be used with respect to visual user interfaces regardless of the application. FIG. 1 illustrates an example environment. A content composer and streaming system 104 (which may include a stitcher component, such as a server, providing stitcher services or where a stitcher system may include a content composer component, or where the content composer and the stitcher may be independent systems) is connected to a network 102. The content composer and streaming system 104 is configured to communicate with client devices $106_1 \ldots 106n$ (e.g., connected televisions, smart phones, laptops, desktops, game consoles, streaming devices that connect to televisions or computers, etc.) that comprise video players. By way of example, the video player may be embedded in a webpage, may be a dedicated video player application, may be part of a larger app (e.g., a game application, a word processing application, etc.), may be hosted by a connected television (CTV), or the like. For example, as described elsewhere herein, the content composer and streaming system 104 may receive a request for media from a given client device 106 in the form of a request for a playlist manifest or updates to a playlist manifest. The content composer and streaming system 104 may identify, from a file, the location and length of an interstitial pod (a time frame reserved for interstitials, wherein one or more interstitials may be needed to fill a pod), determine context information (e.g., information regarding the primary content being requested, information regarding the user, and/or other context information), solicit and select interstitial content from third parties, define customized interstitials as described herein, generate playlist manifests, and/or perform other functions described herein.

The content composer and streaming system 104 and/or another system may stream requested content to the requesting device 106. The content composer and streaming system 104 may stream content to a client device 106 in response to a request from the client device made using a playlist manifest entry or the content composer and streaming system 104 may stream content to a client device 106 in a push manner (in the absence of a client device request).

Optionally, the content composer and streaming system 104 may transmit context information to one or more interstitial source systems $108_1 \ldots 108_n$. For example, the source systems $108_1 \ldots 108_n$ may optionally include ad servers, and the interstitial content may comprise ads. The interstitial source systems $108_1 \ldots 108_n$ may comply with the VAST protocol. By way of further example, the interstitial source systems $108_1 \ldots 108_n$ may provide public service videos, previews of upcoming programs, quizzes, news, games, and/or other content. The interstitial source systems $108_1 \ldots 108_n$ may use the context information in determining what interstitial content is to be provided or offered to the requesting client device 106.

Figure 2A:
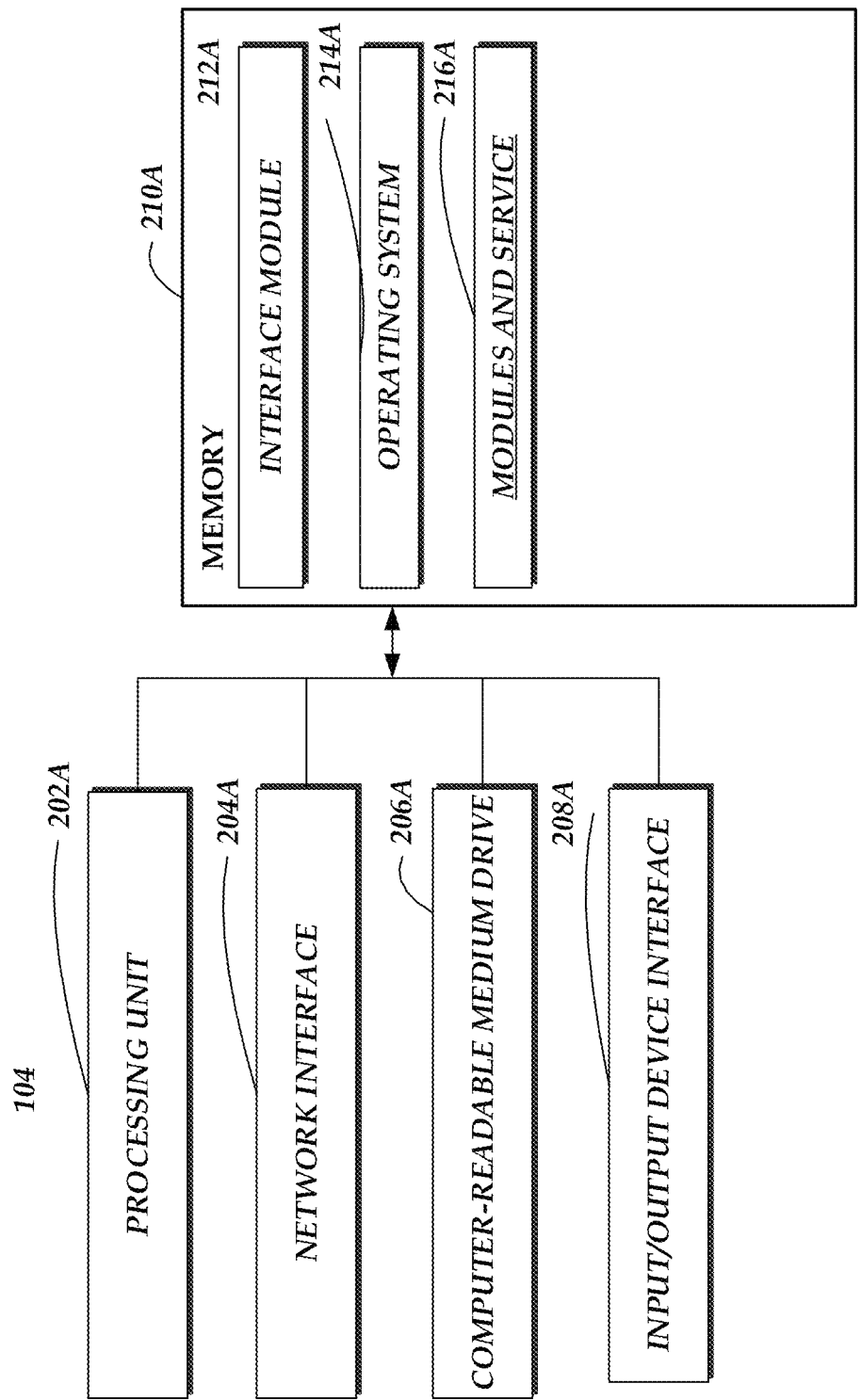
FIG. 2A is a block diagram illustrating example components of a content composer and streaming system.

FIG. 2A is a block diagram illustrating example components of a content composer and streaming system 104. The example content composer and streaming system 104 includes an arrangement of computer hardware and software components that may be used to implement aspects of the present disclosure. Those skilled in the art will appreciate that the example components may include more (or fewer) components than those depicted in FIG. 2A.

The content composer and streaming system 104 may include one or more processing units 202A (e.g., a general purpose processor, an encryption processor, a video transcoder, and/or a high speed graphics processor), one or more network interfaces 204A, a non-transitory computer-readable medium drive 206A, and an input/output device interface 208A, all of which may communicate with one another by way of one or more communication buses. The network interface 204A may provide the various services described herein with connectivity to one or more networks (e.g., the Internet, local area networks, wide area networks, personal area networks, etc.) and/or computing systems (e.g., interstitial source systems, client devices, etc.). The processing unit 202A may thus receive information, content, and instructions from other computing devices, systems, or services via a network, and may provide information, content (e.g., streaming video content), and instructions to other computing devices, systems, or services via a network. The processing unit 202A may also communicate to and from non-transitory computer-readable medium drive 206A and memory 210A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute in order to implement one or more embodiments of the present disclosure. The memory 210A generally includes RAM, ROM and/or other persistent or non-transitory computer-readable storage media. The memory 210A may store an operating system 214A that provides computer program instructions for use by the processing unit 202A in the general administration and operation of the modules and services 216A, including its components. The modules and services 216A are further discussed with respect to FIG. 2B and elsewhere herein. The memory 210A may further include other information for implementing aspects of the present disclosure.

In an example embodiment, the memory 210A includes an interface module 212A. The interface module 212A can be configured to facilitate generating one or more interfaces through which a compatible computing device may send to, or receive from, the modules and services 216A.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include a general purpose processor and may optionally include a video codec. The system 104 may offload certain compute-intensive portions of the modules and services 216A (e.g., transcoding and/or transrating a stream for adaptive bitrate operations, compositing, and/or the like) to one or more dedicated devices, such as a video codec (e.g., H.264 encoders and decoders), while other code may run on a general purpose processor. The system 104 may optionally be configured to support multiple streaming protocols, may provide low latency pass-through, and may support a large number of parallel streams (e.g., HD, 4K, and/or 8K streams). The processing unit 202A may include hundreds or thousands of core processors configured to process tasks in parallel. A GPU may include high speed memory dedicated for graphics processing tasks. As another example, the system 104 and its components can be implemented by network servers, application servers, database servers, combinations of the same, or the like, configured to facilitate data transmission to and from data stores, user terminals, and third party systems via one or more networks. Accordingly, the depictions of the modules are illustrative in nature.

The modules and services 216A may include modules that provide a playlist request service, an interstitial selection service 204B (which may also select sections to create a customized interstitial), and a playlist manifest generation service 208B.

The playlist request service 202B may receive and process requests for playlist manifests. The interstitial selection service 204B may assemble content information for a given interstitial pod (e.g., the length of the interstitial pod, the subject matter of requested primary content, information regarding a channel the viewer is watching, the content of a scene in which the interstitial pod is located, etc.) and transmit the information to one or more interstitial source systems. The interstitial source systems may propose interstitial content to the interstitial selection service 204B of the stitching system. The interstitial selection service 204B may evaluate the proposals and select one or more items of interstitial content for inclusion in the interstitial pod.

The section selection service 206B may select sections, among alternative sections, for various insertion points of an interstitial. For example, the section selection service 206B may access from memory and use user data, interstitial/interstitial section metadata, and/or primary content (including primary content channel metadata) to select sections from set of alternative sections to insert at a given interstitial insertion point. The section selection service 206B may be used to perform some or all states of processes described herein.

The manifest generation service 208B may be used to assemble a playlist manifest (e.g., an HLS or MPEG DASH manifest) including locators (e.g., URLs) pointing to segments and sections of primary and interstitial content and locators (e.g., URLs), organized to correspond to the desired playback sequence. The manifest may be transmitted to a client on a user device. The client may then request a given item of content (e.g., section or segment) as needed, which may then be served (e.g., streamed) by the corresponding content source or intermediary to the client.

The content streaming service 210B may stream content (e.g., video content) to content reproduction user devices 106 or other destination.

Figure 2C:
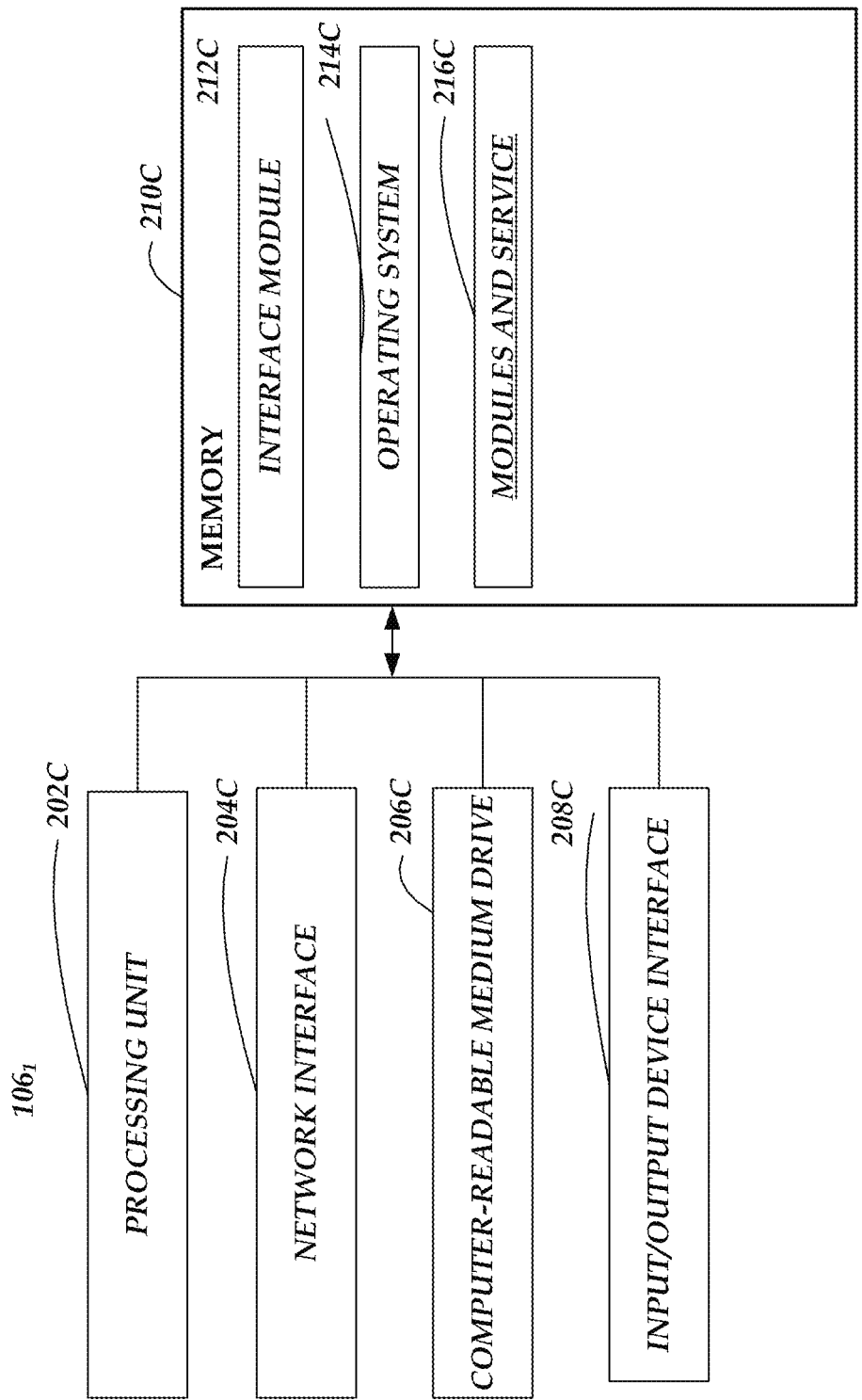
FIG. 2C is a block diagram illustrating example components of a content reproduction system.

FIG. 2C is a block diagram illustrating example components of a user device/connected TV (CTV) 106$_1$. The example CTV 106 includes an arrangement of computer hardware and software components that may be used to implement aspects of the present disclosure. Those skilled in the art will appreciate that the example components may include more (or fewer) components than those depicted in FIG. 2C.

The CTV 106 may include one or more processing units 202C (e.g., a general purpose processor, an encryption processor, a video transcoder, and/or a high speed graphics processor), one or more network interfaces 204C, a non-transitory computer-readable medium drive 206C, and an input/output device interface 208C, all of which may communicate with one another by way of one or more communication buses. The network interface 204C may provide the various services described herein with connectivity to one or more networks or computing systems, such as the content composer and streaming system 104, the source systems 108$_1$ . . . 108$_n$, and other content streaming systems. The processing unit 202C may thus receive information, content, and instructions from other computing devices, systems, or services via a network and may transmit information, content, and instructions to other computing devices, systems, or services via a network. The processing unit 202C may also communicate to and from non-transitory computer-readable medium drive 206C and memory 210C and further provide output information via the input/output device interface 208C. The input/output device interface 208C may also accept input from various input devices (which may be integral to the CTV 106 or remote from the CTV 106), such as a keyboard, buttons, knobs, sliders, remote control, mouse, digital pen, touch screen, microphone (e.g., to receive voice commands), cameras, light intensity sensors, etc.

The memory 210C may contain computer program instructions that the processing unit 202C may execute in order to implement one or more embodiments of the present disclosure. The memory 210C generally includes RAM, ROM and/or other persistent or non-transitory computer-readable storage media. The memory 210C may store an operating system 214C that provides computer program instructions for use by the processing unit 202C in the general administration and operation of the modules and services 216C, including its components. The modules and services 216C are further discussed with respect to FIG. 2D and elsewhere herein. The memory 210C may further include other information for implementing aspects of the present disclosure.

In an example embodiment, the memory 210C includes an interface module 212C. The interface module 212C can be configured to facilitate generating one or more interfaces through which a compatible computing device may send to, or receive from, the modules and services 216C.

With reference to FIG. 2D, the modules and services 216C may include a video streaming component/application ("app") 202D, further comprising a video rendering component 204D (which may communicate with the content composer and streaming system 104, the source systems $108_1 \ldots 108_n$, and/or other content streaming systems), an access authorization component 206D, a user interface generation component 208D, and a screen reader enhancement interpreter component 210D that enables legacy devices, and other content reproduction devices lacking adequate accessibility features (include new devices), to provide enhanced assistive technologies (e.g., ARIA-compliant screen reading services) as described herein.

The modules or components described above may also include additional modules or may be implemented by computing devices that may not be depicted in FIGS. 2C and 2D. For example, although the interface module 212C and the modules and services 216C are identified in FIG. 2B as single modules, the modules may be implemented by two or more modules and in a distributed manner. By way of further example, the processing unit 202C may optionally include a general purpose processor and may optionally include a video codec. The CTV 106 may offload certain compute-intensive portions of the modules and services 216C (e.g., transcoding and/or transrating a stream for adaptive bitrate operations, compositing, and/or the like) to one or more dedicated devices, such as a video codec (e.g., H.264 encoders and decoders), while other code may run on a general purpose processor. The system 104 may optionally be configured to support multiple streaming protocols, may provide low latency pass-through, and may support a large number of parallel streams (e.g., HD, 4K, and/or 8K streams). The processing unit 202C may include hundreds or thousands of core processors configured to process tasks in parallel. A GPU may include high speed memory dedicated for graphics processing tasks.

For example, a request for a playlist manifest (e.g., an HLS .m3u8 or an MPEG DASH .mpd manifest file) may be transmitted (e.g., by a stitcher system) over a network (e.g., a wired or wireless network) by the video streaming component/application 202D on a user device 106 which may enable the content to be played via a video player. The request may be for an item of primary content, such as a prerecorded movie, prerecorded program, or live sporting event or other content item. The request or other communication may identify user device characteristics such as device manufacturer, device model, display size (e.g., display height and width in pixels), device height/width ratio, device operating system, and/or other information.

The request for an item of content (and hence the playlist manifest) may have been triggered by the user manually clicking on a play control of the user device 106 or the request may have been automatically issued by an application. For example, if the user has completed playing a first movie (or other content), an application (e.g., such as that described in U.S. Pat. No. 9,258,589, titled "METHODS AND SYSTEMS FOR GENERATING AND PROVIDING PROGRAM GUIDES AND CONTENT," issued Feb. 9, 2016, and/or U.S. application Ser. No. 15/635,764, titled "METHODS AND SYSTEMS FOR GENERATING AND PROVIDING PROGRAM GUIDES AND CONTENT," filed Jun. 28, 2017, the contents of which are incorporated by reference in their entirety) may automatically request a manifest for the next scheduled item of primary content.

The next scheduled primary content item may be scheduled in accordance with a program guide, where the program guide may include multiple channels (e.g., corresponding to different subject matters), where a given channel has associated programs (e.g., movies, programs, live sporting events, or other items of content) with scheduled start and end times. Thus, for example, a manifest for an item of primary content may be automatically requested based at least in part on a comparison of the current time and the scheduled starting time for the item of content. If the difference between the current time and the scheduled starting time satisfies a threshold (which could be 0 seconds, or some larger number (e.g., 0.5, 1, or 2 seconds) to enable buffering of the program prior to the start time) the corresponding playlist manifest may be automatically requested and provided to the video player.

The playlist manifest request may be received by the content composer and streaming system 104. The content composer and streaming system 104 may identify the location and length of interstitial pods within the requested primary content. For example, the content composer and streaming system 104 may access a file or other metadata associated with the primary content that indicates the positions within the primary content for interstitial pods, wherein a given interstitial pod may have a specified length (e.g., 15 seconds, 30 seconds, 1 minute, 2 minutes, or other length). The interstitial pod may optionally include an indication that a customized interstitial is to be played. The sections for the customized interstitial may be selected from alternative sections. In addition, if there is not enough information to select a section for a given insertion point based on selection criteria, a default section may be selected. In addition, a given section of the customized interstitial may optionally be common for all customized versions of the interstitial content.

The content composer and streaming system 104 may generate the playlist manifest. For example, the manifest file may be an HLS .m3u8 or an MPEG DASH .mpd manifest file. The manifest file may include locators (URLs) for each primary content segment, and each interstitial segment and/or section (where optionally an interstitial section is equal to a segment length or an integer multiple thereof) in the desired playback order. The manifest file may include the entire playlist for the requested content or only a portion thereof.

The content composer and streaming system 104 may transmit the manifest file to the video streaming component/application 202D on the user device 106 which may enable the content to be played via a video player video player. The client player may request content, including interstitial content segments/sections, in accordance with the playlist manifest. The content composer and streaming system 104 receives the content requests, including requests for interstitial content segments/sections from the client in sequential order. The content composer and streaming system 104 may stream the content, or cause the content to be streamed from a different source, to the video play hosted by the user device 106.

Although in the foregoing example, the identification and selection of sections for a customized content item, as well as the generation of a manifest, are performed at least partly in response to a request from a client on a user device, optionally these operations may be performed independent of and prior to such a client request. For example, the section selection and manifest generation may be performed independently of and prior to (and in anticipation of) a client request, and such selection and/or generated manifest may be stored in memory for later use in generating the customized content item and enabling the client to access such customized content item. Further, the customized interstitial may be streamed to the user device immediately before, during, or after the corresponding item of primary content. Optionally, rather than being streamed to and displayed by the user device between segments of primary content, the ancillary content, customized as disclosed herein, may be configured to be displayed as an overlay with respect to the primary content (e.g., a banner occupying a portion of the playback display area, while still enabling the primary content to be viewed in whole or part).

Figure 3:
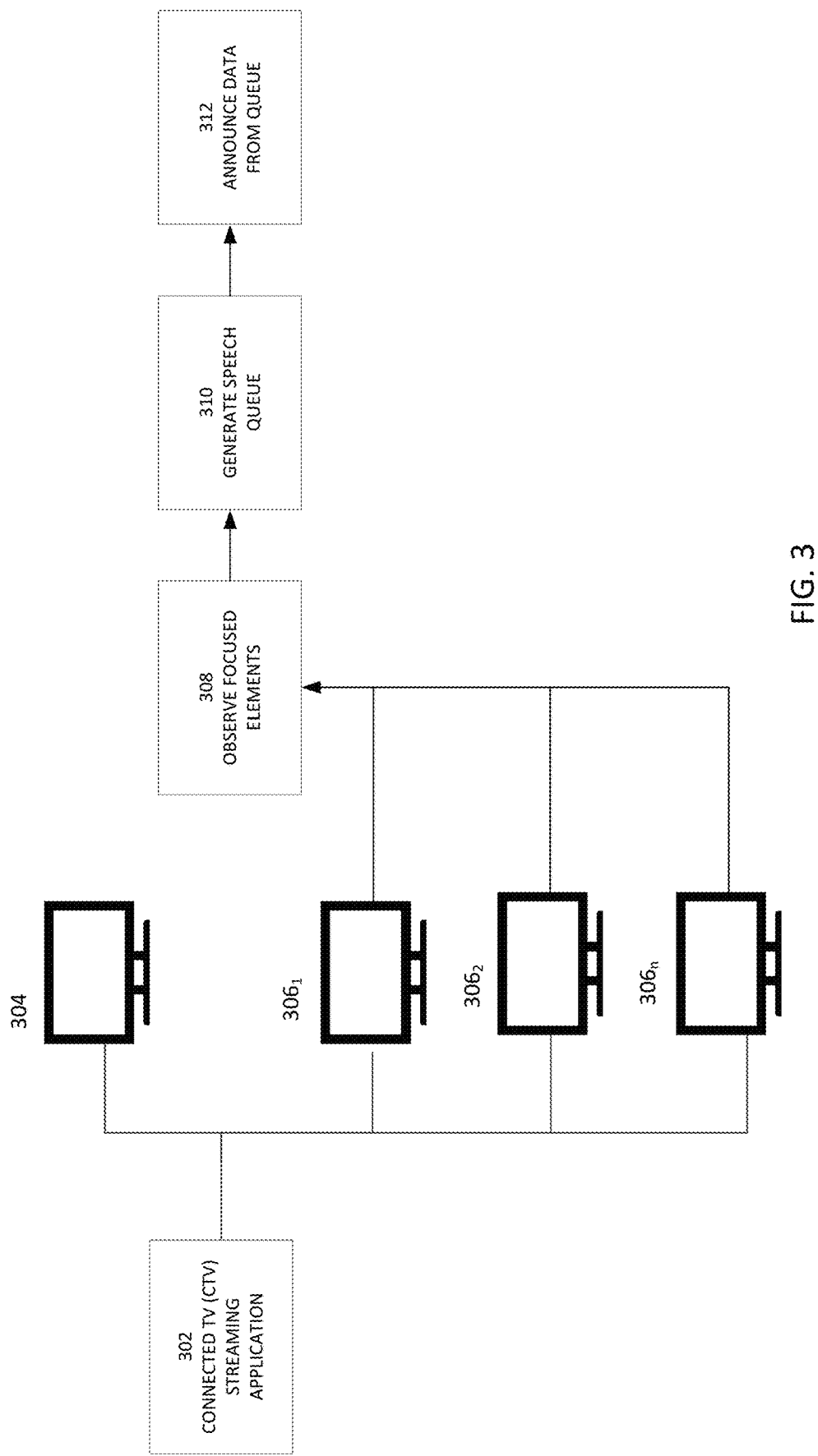
FIGS. 3 and 4 illustrate example environments and processes.

Referring to FIG. 3, an example environment and process are illustrated. In this example, the user devices are connected TVs that are coupled to the Internet and that are capable of receiving streaming content over the Internet. A connected TV application 302 is installed on connected TVs 304, 306$_1$, 306$_2$, . . . 306$n$. Optionally, different versions of the connected TV application 302 may be installed on different models of connected TVs, where a given version of the connected TV application 302 may include interpreter code (e.g., screen reader enhancement interpreter component 210D) needed to provide the ARIA functionality missing from the given TV and may not include interpreter code for ARIA functionality already supported by the connected TV, thereby reducing TV memory utilization and network bandwidth needed to transmit the interpreter code. The connected TV application may be configured to receive streaming content from one or more Over The Top (OTT) streaming services. The connected TV application 302 (e.g., video streaming component/application 202D) may be installed by the CTV manufacturer prior to it being shipped to stores or end users, or the connected TV application 302 may be downloaded over the internet (e.g., from an app store) and installed by the user one in the connected TV is in the user's possession.

In this example, connected TV 304 is fully ARIA compliant, and connected TVs 306$_1$, 306$_2$, . . . 306$n$ are either not ARIA compliant or are only partially compliant. Thus, the connected TV application 302 installed on connected TV 304 may optionally not include the interpreter code described herein that interprets ARIA code. Hence, the functionally described with respect to performing such interpretation may not be applied with respect to the connected TV 304. Further, to the extent that TVs 306$_1$, 306$_2$, . . . 306$n$ have different levels of ARIA compliance, different versions of the connected TV application 302 so that unnecessary interpreter code is not installed on the corresponding connected TV.

At block 308, the component determines the focused user interface elements for a displayed user interface.

For example, the component obtains information regarding the Document Object Model (DOM), or the HTML structure of the user interface (which may be in the form of an HTML page). The component observes focused elements. HTML elements can be focusable if they have associated semantics. Focusable elements are typically calls to action or navigation, which may include input, text area, button, anchor tags, etc. Non-focusable elements are elements that are used to show a structure, such as div and p tags, h1-h6, etc. These elements can gain some focusability using ARIA labels. Focus may refer to an element that will receive a user input (e.g., via keyboard, remote control, voice input, etc.) and similar events. Thus, an element may be focused by a user selecting a particular visual element or component on a television screen.

For example, the component may utilize the HTML DOM activeElement Property to determine the currently focused element as follows:

Syntax: var ele=document.activeElement;
Return value: the currently focused element in the document.

At block 310, the component generates a speech queue. At block 312, the screen reader audibly announces data from the queue.

Figure 4:
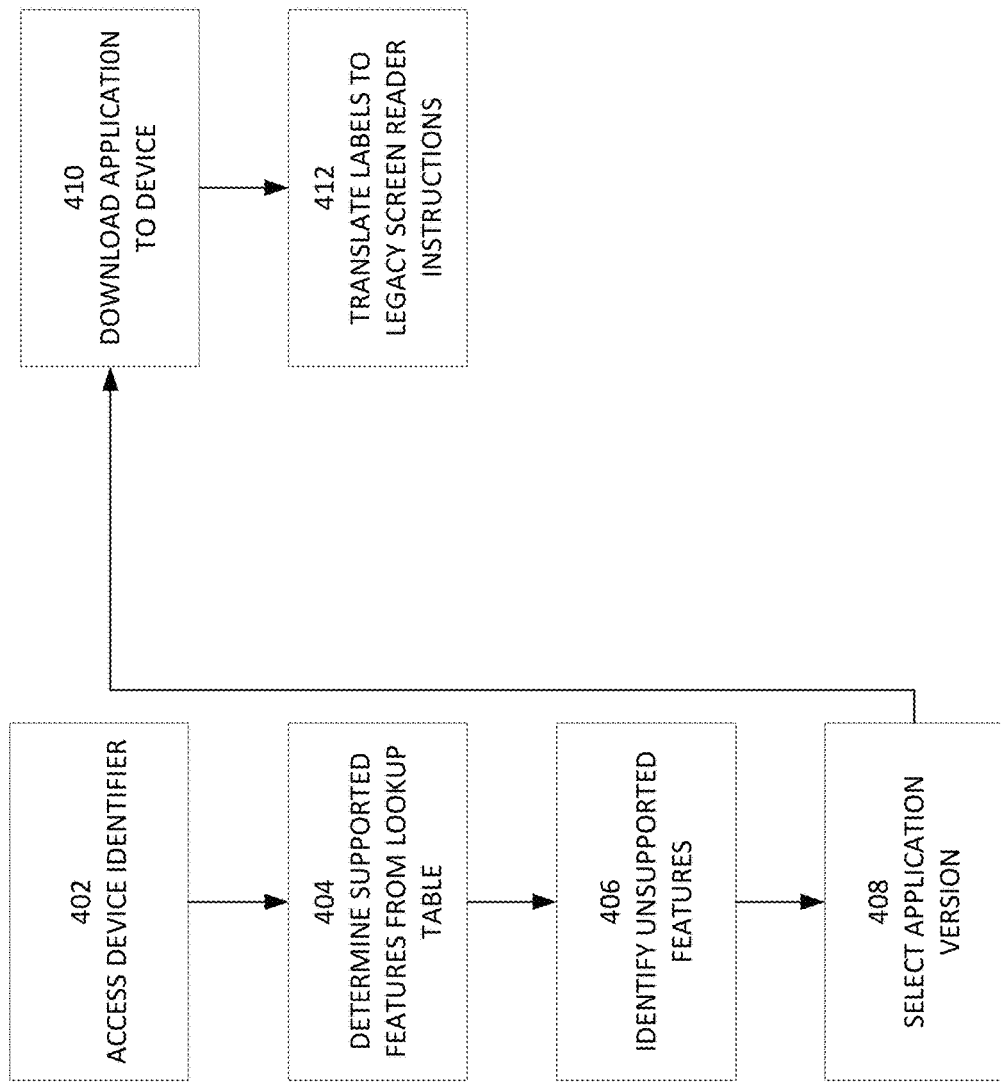

FIG. 4 illustrates an example process. The process may optionally be implemented using the example systems and components described elsewhere herein (e.g., content composer and streaming system 104 and/or a user device 106 (e.g., a television, laptop, smartphone, game console, or the like), and some or all of the components therein (e.g., video streaming component/application 202D). The example process enables a legacy user device (or other content reproduction devices, including new model content reproduction devices), that does not support or does not fully support screen reader functionality (e.g., in accordance with the ARIA specification) to transparently provide support screen reader functionality (e.g., in accordance with the ARIA specification). The process may utilize a capabilities table or other data structure that stores user device (e.g., television) ARIA capabilities in association with user devices' respective identifiers of the user device manufacturers and model number (e.g., manufacturer: ACME Manufacturing Co; model: X1ABC).

At block 402, device data is accessed from the user device (e.g., accessed from device read only memory via a TV input module), such as the build year, model type, manufacturer, browser type (e.g., EDGE, CHROME, SAFARI, OPERA), browser release/version, and/or the like. For example, the device data may be accessed from the user device by a content streaming system over a network, such as the Internet. At block 404, using some or all of the device data, a determination is made (e.g., using the capabilities lookup table described herein) as to what ARIA capabilities (if any) the device has). By way of illustration, a search of a capabilities lookup table may be performed using certain user device data to locate a matching entry. If a matching entry is found, the corresponding assistive support functionality may be determined. For example, a determination may be made as to whether the device has text-to-speech capabilities and in particular, a determination may be made as to what screen-reading capabilities and/or ARIA support the user device has. At block 406, a determination may be made from the table as to what capabilities (e.g., screen-reading capabilities and/or ARIA support capabilities) the user device is lacking.

At block 408, the appropriate streaming application version with the appropriate interpreter code is selected. For example, optionally the selected streaming application (e.g., a connected TV application) is configured to include the minimum amount of code needed to perform the interpreter functions needed to fill in the ARIA functionality from the user device/television, and does not include code to perform ARIA interpretation services for ARIA functionality already supported by the television. Thus, for example, a master version of ARIA interpreter code may be generated that assumes that the target television does not provide any ARIA support. The master code may then be downloaded to respective different televisions and the import and export statements may be utilized to detect if code modules are exported and imported for use between files (e.g., JavaScript files, Python files, or the like). The unused interpreter code for a given television may be deleted from the version of the application for that manufacturer and model to provide minimized interpreter code. For example, the version of the application may be stored in association with identification information corresponding to the manufacturer(s), model(s), and/or browser type, browser release/version, that the minimized interpreter code is suitable for.

Advantageously, the reduction of interpreter code reduces the network bandwidth needed to download the interpreter code to the television, the time it would take to download the interpreter code to the television, and the amount of the television's local memory needed to store the interpreter code.

At block 410, the selected streaming application is downloaded (e.g., via the Internet) to the connected television.

At block 412, different properties in the HTML code of a user interface are used by the interpreter code included in the streaming application to inform a screen reader what is happening on screen (e.g., what controls are being presented, where there is focus, etc.). The process may translate labels in the HTML code to instructions compatible with the legacy device's (or other content reproduction device or user interface presentation device) browser or other display software so that the legacy device (or other content reproduction device or user interface presentation device) may perform a text-to-speech as if the legacy device (or other content reproduction device or user interface presentation device) was fully compatible with ARIA screen reader functionality.

Figure 5A:
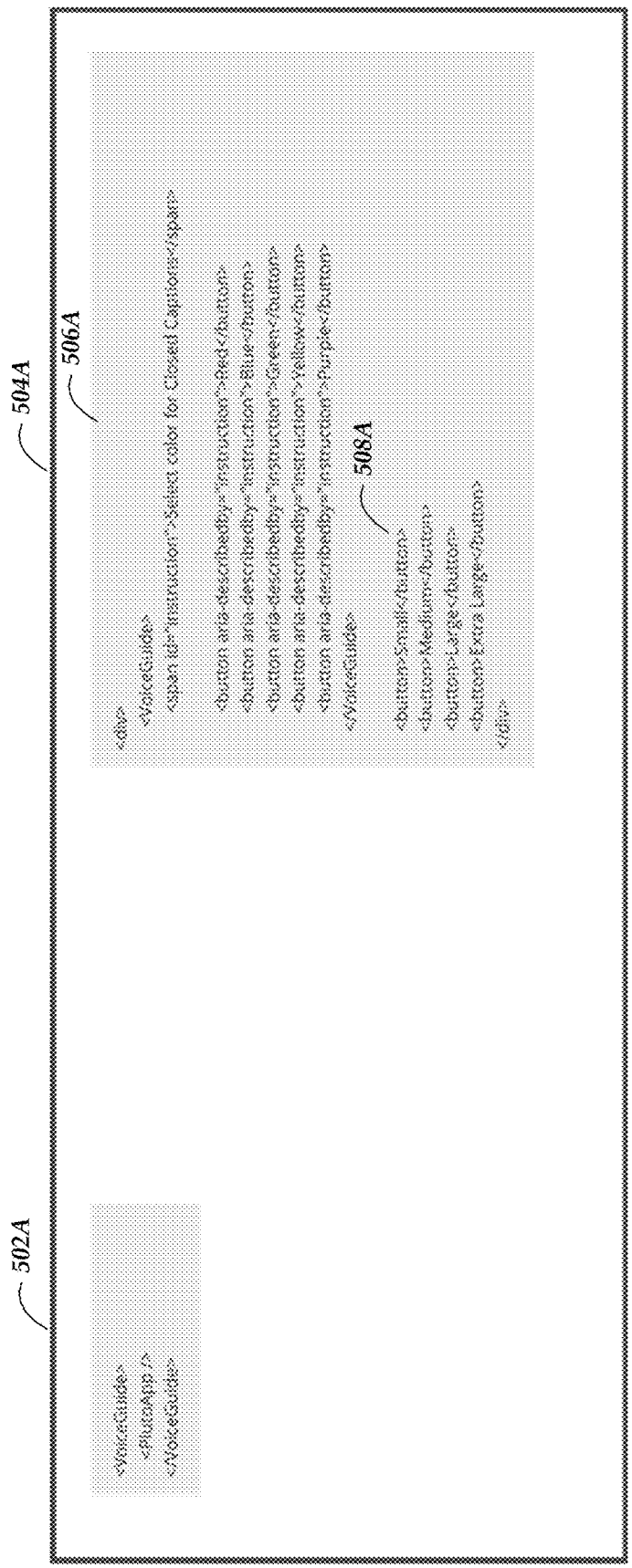
FIGS. 5A-6C illustrate example code and user interfaces.

FIG. 5A illustrates two example approaches implementing the interpreter code with respect to code of a connected TV application. Code 502A illustrates how the entire connected TV application is wrapped in an interpreter component (referred to as Voice Guide in this example). In this configuration, the interpreter code will detect any specified ARIA attributes, although, for a given version of the connect TV application, the application configuration can be set to include or exclude specified ARIA rules.

Code 504A illustrates that the interpreter code can be limited to a specific section of the connected TV streaming application. Code 506A is a first code section wrapped in an interpreter component (Voice Guide), and a second code section 508A is a second section that is not wrapped in interpreter code, and hence the interpretation function will not be provided with respect to code section 508A. Thus, for example, no interpretation of ARIA roles will be performed with respect to the HTML Button elements in code section 508A. Instead, the interpreter code is limited to that between the Voice Guide text.

Figure 5B:
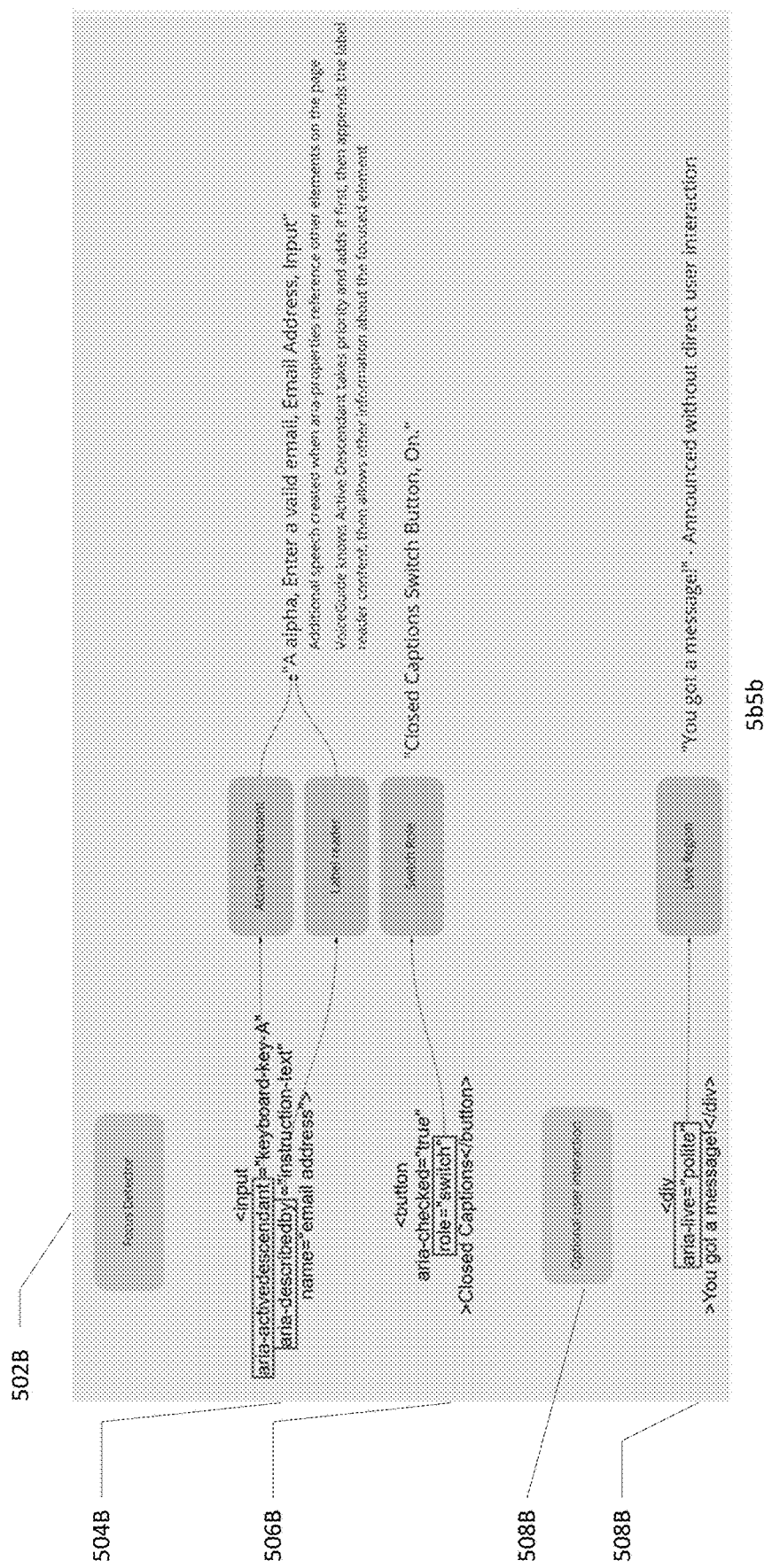

FIG. 5B illustrates additional example code. In this example, a focus detector 502B includes code portions 504B, 506B. The example interpreter code generates additional speech when an ARIA property references other elements on a page. The interpreter code is configured to provide priority to the aria-activedescendant property and so adds it first to the queue of text to be spoken, then appends the label reader content, and then provides other information regarding the focused element.

As described above, the aria-activedescendant property enables the focus for assistive technologies on interactive elements to be managed when such interactive elements contain multiple focusable descendants (e.g., toolbars, menus, grids, and/or the like), and may be used with respect to composite widgets, groups, textboxes, or applications whose id is referenced as an attribute value. The aria-activedescendant property may be used on container elements to refer to the currently active element, informing assistive technology users of the currently active element when focused.

In the example illustrated in FIG. 5B, the activedescendant property is set to "keyboard-key-A". The aria-described by attribute is set to "instruction-text", and the name is set to "email address." The interpreter code interprets the foregoing as "A alpha, Enter a valid email, email address, input."

With respect to code portion 506B, the button role has aria-checked attribute (which indicates the current "checked" state of checkboxes, radio buttons, and other widgets) set to "true", the role is set to "switch", and the content is set to "Closed Captions". The interpreter code will interpret the foregoing at "Closed Captions Switch Button, On."

Referring to option user action 508B. the code portion 508B, the div section has the aria-live attribute set to "polite" and the content set to "You got a message." Once any current announcement is complete, the interpreter code will cause "You got a message" to be announced, without direct user interaction.

Certain examples will now be described with reference to screen reader capabilities with respect to an onscreen keyboard.

Figure 6A:
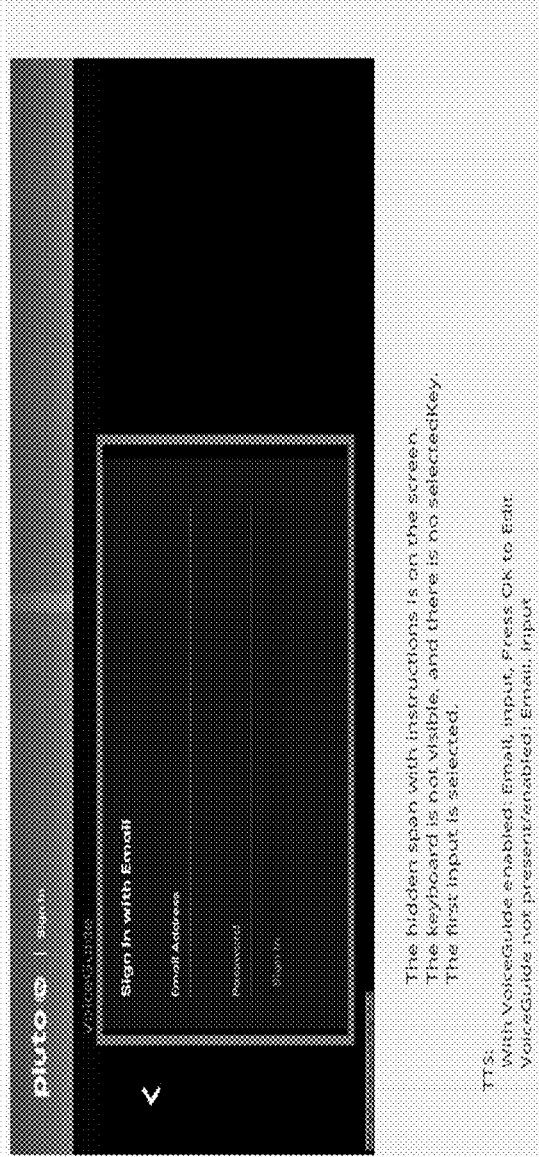

Referring to FIG. 6A and the illustrated code, the keyboard is not displayed until the user selects an OK button to call up the keyboard (if the keyboard is displayed, selecting the OK button will not change keyboard visibility in this example). The corresponding screen reading only needs to be spoken if the keyboard is not displayed. The code may be prompted with instructions on how to call up the keyboard and edit a text field ("press OK to edit"). In the absence of the interpreter code, the native application and television would not provide the "press OK to edit" voice prompt.

Thus, in the scenario where the keyboard is not displayed, without the voice guide interpreter code, the native text to speech functionality of the television would speak:

"Email, input"

In the same scenario, where the keyboard is not displayed, but with the voice guide interpreter code present/enabled, the television would speak:

"Email, input, Press OK to edit"

Thus, the interpreter code provides significantly enhanced voice assistance as compared to the native television text-to-voice function by providing ARIA functionality which was lacking in the native television.

Figure 6B:
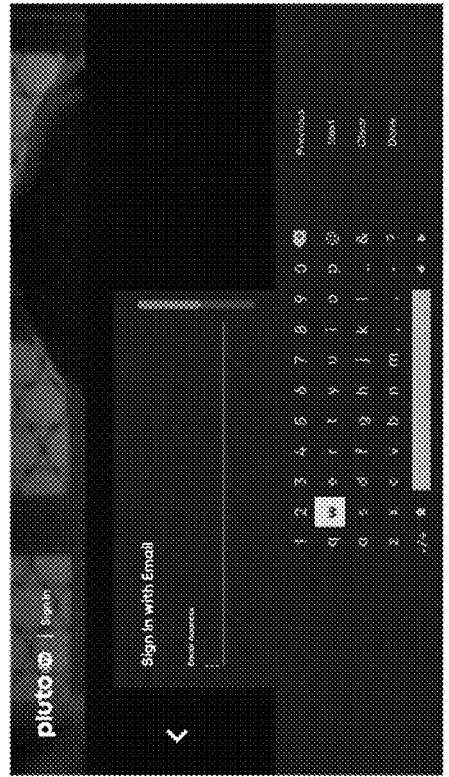

Referring to the example illustrated in FIG. 6B, the onscreen keyboard is already displayed. The aria-activedescendant property is set to whatever keyboard key the user selected, the aria-described by attribute lists "instruction text" as the ID of the elements that describe the object (e.g., the ID of an element that provides some additional information about the current element that users may. need). When a key is selected, the key's ID becomes the selectedKey referenced in each of the above inputs <input>.

Thus, in the scenario where the keyboard is displayed, without the voice guide interpreter code when the user selects the "W" key ("Wonder Woman selected=true" and "Quiz show selected=false"), the native text to speech functionality of the television would speak:

"Email, input"

In the same scenario, but with the voice guide interpreter code present/enabled, when the user selects the "W" key the television would speak:

"w Wonder Woman, Email, input"

Figure 6C:
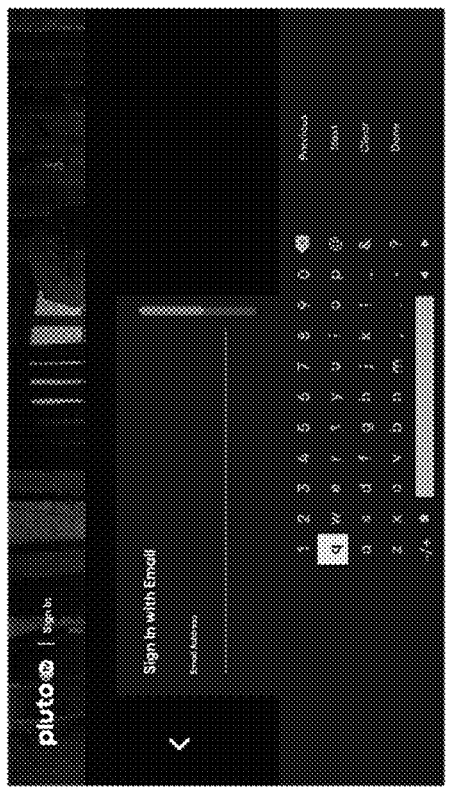

Referring to the example illustrated in FIG. 6C (which is similar to that of FIG. 6B), the onscreen keyboard is already displayed. The aria-activedescendant property is set to whatever keyboard key the user selected, the aria-described by attribute lists "instruction text" as the ID of the elements that describe the object. When a key is selected, the key's ID becomes the selectedKey referenced in each of the above inputs <input>.

Thus, in the scenario where the keyboard is displayed, without the voice guide interpreter code, when the user selects the "Q" key ("Wonder Woman selected=false" and "Quiz show selected=true"), the native text to speech functionality of the television would speak:

"Email, input"

In the same scenario, but with the voice guide interpreter code present/enabled, when the user selects the "Q" key the television would speak:

"Q Quiz Show, Email, input"

Various aspects disclosed herein may be used in combination or separately

A first aspect of the disclosure relates to methods and systems configured to access connected device data from a connected device, the connected device data comprising a manufacturer identifier, a model identifier, an identifier of a year of manufacturer, browser type, and/or browser release/version. Using the connected device data, a version of code is selected comprising interpreter code configured to provide the connected device with accessibility functionality in accordance with a specification attributes and roles that enables enhanced screen reader functionality that the connected device is natively lacking. The selected version of the code is downloaded to the connected device, wherein the selected version of the code is configured to enable the connected device to generate enhanced audible announcements relative to announcements that the connected device would natively provide.

A second aspect of the disclosure relates to a system for providing enhanced screen reader assistive functionality to connected televisions, the system comprising: a computer device; a network interface; non-transitory computer readable memory having program instructions stored thereon that when executed by the computer device cause the system to perform operations comprising: generate a master set of code comprising interpreter code that supplies Accessible Rich Internet Applications (ARIA) functionality for connected televisions that lack any built-in support for ARIA by interpreting ARIA attributes so that the connected televisions can generate corresponding audible announcements; determine built-in functionality for a plurality of televisions of different manufacturers, manufacturer models, year of manufacturer, browser type, and/or browser release/version; based at least in part on the determined built-in functionality for the plurality of televisions, generate, from the master set of code, a plurality of versions of code comprising respective subsets of the interpreter code that supplies ARIA functionality included in the master set of code; access, over a network via the network interface from a connected television, connected television data, the connected television data comprising a manufacturer identifier, a model identifier, an identifier of a year of manufacturer, browser type, and/or browser release/version of the connected television; and based at least in part on the connected television data, select a version of the code comprising a subset of the interpreter code included in the master set of code that is configured to provide the connected television with ARIA functionality; cause the selected version of the code, comprising the subset of the interpreter code included in the master set of code that is configured to provide the connected television with ARIA functionality, to be downloaded to the connected television, wherein the selected version of the code is configured to enable the connected television to generate audible announcements corresponding to ARIA attributes.

A third aspect of the disclosure relates to wherein the selected version of the code, comprising the subset of the interpreter code included in the master set of code that is configured to provide the connected television with ARIA functionality, is configured to interpret one or more ARIA relationship attributes.

A fourth aspect of the disclosure relates to wherein the selected version of the code, comprising the subset of the interpreter code included in the master set of code that is configured to provide the connected television with ARIA functionality, is configured to prioritize text-to-speech actions based at least in part on an ARIA-live attribute.

A fifth aspect of the disclosure relates to wherein the selected version of the code, comprising the subset of the interpreter code included in the master set of code that is configured to provide the connected television with ARIA functionality, is configured to manage a text-to-speech queue based at least in part on an attribute comprising polite and/or assertive.

A sixth aspect of the disclosure relates to wherein the selected version of the code, comprising the subset of the interpreter code included in the master set of code that is configured to provide the connected television with ARIA functionality, wraps all code of a connected television application.

A seventh aspect of the disclosure relates to wherein the selected version of the code, comprising the subset of the interpreter code included in the master set of code that is configured to provide the connected television with ARIA functionality, wraps only a subset of code of a connected television application.

An eighth aspect of the disclosure relates to wherein the selected version of the code, comprising the subset of the interpreter code included in the master set of code that is configured to provide the connected television with ARIA functionality, is configured to enable assistive voice prompts to be generated that would not be generated via native functionality of the connected television.

A ninth aspect of the disclosure relates to a computer implemented method, the method comprising: accessing over a network, from a connected television, connected television data, the connected television data comprising a manufacturer identifier, a model identifier, an identifier of a year of manufacturer, browser type, and/or browser release/version of the connected television; based at least in part on the connected television data, selecting a version of code comprising interpreter code configured to provide the connected television with ARIA functionality that the connected television is natively lacking; and causing the selected version of the code, comprising the interpreter code configured to provide the connected television with ARIA functionality that the connected television is natively lacking, to be downloaded to the connected television, wherein the selected version of the code is configured to enable the connected television to generate audible announcements corresponding to ARIA attributes.

A tenth aspect of the disclosure relates to wherein the selected version of the code, comprising the interpreter code configured to provide the connected television with ARIA functionality that the connected television is natively lacking, is configured to interpret one or more ARIA relationship attributes.

An eleventh aspect of the disclosure relates to wherein the selected version of the code, comprising the interpreter code configured to provide the connected television with ARIA functionality that the connected television is natively lacking, is configured to prioritize text-to-speech actions based at least in part on an ARIA-live attribute.

A twelfth aspect of the disclosure relates to wherein the selected version of the code, comprising the interpreter code configured to provide the connected television with ARIA functionality that the connected television is natively lacking, is configured to manage a text-to-speech queue based at least in part on an attribute comprising polite and/or assertive.

A thirteenth aspect of the disclosure relates to, wherein the selected version of the code, comprising the interpreter code configured to provide the connected television with ARIA functionality that the connected television is natively lacking, wraps all code of a connected television application.

A fourteenth aspect of the disclosure relates to wherein the selected version of the code, comprising the interpreter code configured to provide the connected television with ARIA functionality that the connected television is natively lacking, wraps only a subset of code of a connected television application.

A fifteenth aspect of the disclosure relates to wherein the selected version of the code, comprising the interpreter code configured to provide the connected television with ARIA functionality that the connected television is natively lacking, is configured to enable assistive voice prompts to be generated that would not be generated via native functionality of the connected television.

A sixteenth aspect of the disclosure relates to Non-transitory computer readable memory having program instructions stored thereon that when executed by a computing device cause the computing device to perform operations comprising: accessing over a network, from a connected device, connected device data, the connected device data comprising a manufacturer identifier, a model identifier, an identifier of a year of manufacturer, browser type, and/or browser release/version of the connected device; based at least in part on the connected device data, selecting a version of code comprising interpreter code configured to provide the connected device with accessibility functionality in accordance with a specification attributes and roles that enables enhanced screen reader functionality that the connected device is natively lacking; and cause the selected version of the code, comprising the interpreter code configured to provide the connected device with accessibility functionality in accordance with a specification of attributes and roles that enable enhanced screen reader functionality that the connected device is natively lacking, to be downloaded to the connected device, wherein the selected version of the code is configured to enable the connected device to generate enhanced audible announcements relative to announcements that the connected device would natively provide.

A seventeenth aspect of the disclosure relates to wherein the selected version of the code, comprising the interpreter code configured to provide the connected device with accessibility functionality in accordance with a specification of attributes and roles that enable enhanced screen reader functionality that the connected device is natively lacking, is configured to interpret one or more relationship attributes.

An eighteenth aspect of the disclosure relates to wherein the selected version of the code, comprising the interpreter code configured to provide the connected device with accessibility functionality in accordance with a specification of attributes and roles that enable enhanced screen reader functionality that the connected device is natively lacking, is configured to prioritize text-to-speech actions based at least in part on a live attribute.

A nineteenth aspect of the disclosure relates to wherein the selected version of the code, comprising the interpreter code configured to provide the connected device with accessibility functionality in accordance with a specification of attributes and roles that enable enhanced screen reader functionality that the connected device is natively lacking, is configured to manage a text-to-speech queue based at least in part on an attribute comprising polite and/or assertive.

A twentieth aspect of the disclosure relates to wherein the selected version of the code, comprising the interpreter code configured to provide the connected device with accessibility functionality in accordance with a specification of attributes and roles that enable enhanced screen reader functionality that the connected device is natively lacking, wraps all code of a connected device application.

A twenty first aspect of the disclosure relates to wherein the selected version of the code, comprising the interpreter code configured to provide the connected device with accessibility functionality in accordance with a specification of attributes and roles that enable enhanced screen reader functionality that the connected device is natively lacking, wraps only a subset of code of a connected device application.

A twenty second aspect of the disclosure relates to wherein the selected version of the code, comprising the interpreter code configured to provide the connected device with accessibility functionality in accordance with a specification of attributes and roles that enable enhanced screen reader functionality that the connected device is natively lacking, is configured to enable assistive voice prompts to be generated that would not be generated via native functionality of the connected device.

Thus, as described herein, systems and methods are disclosed that overcome the technical problems related to providing assistive technologies (e.g., screen reader functionality) via legacy devices (or other content reproduction devices or user interface presentation devices), while greatly reducing the amount of memory and processing power needed to provide such assistive technologies.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop-down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the systems, devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for providing enhanced screen reader assistive functionality to connected televisions, the system comprising:
   a computer device;
   a network interface; and
   non-transitory computer readable memory having program instructions stored thereon that when executed by the computer device cause the system to perform operations comprising:
   generate a master set of code comprising interpreter code that supplies Accessible Rich Internet Applications (ARIA) functionality for connected televisions that lack any built-in support for ARIA by interpreting ARIA attributes so that the connected televisions can generate corresponding audible announcements;
   determine corresponding levels of built-in ARIA functionality for a plurality of respective televisions of different manufacturers, manufacturer models, and year of manufacture;
   based at least in part on the determined corresponding levels of built-in ARIA functionality for the plurality of respective televisions, generate, from the master set of code, a plurality of versions of code comprising respective subsets of the interpreter code that supplies different levels of ARIA functionality included in the master set of code;
   access, over a network via the network interface from a connected television comprising a video codec, connected television data, the connected television data comprising a manufacturer identifier, a model identifier, and an identifier of a year of manufacture of the connected television;
   use the connected television data to determine from a capabilities data structure that the connected television natively provides a first subset of ARIA functionality and fails to natively provide a second subset of ARIA functionality;
   select a version of the code comprising a subset of the interpreter code included in the master set of code that is configured to provide the connected television with the second subset of ARIA functionality;
   push the selected version of the code, comprising the subset of the interpreter code included in the master set of code that is configured to provide the connected television with the second subset of ARIA functionality, to be downloaded to the connected television, wherein the selected version of the code is configured to enable the connected television to generate audible announcements corresponding to ARIA attributes;
   in response to detecting an update to an ARIA specification, update the master set of code;
   access, over the network via the network interface from a second connected television, second connected television data, the second connected television data comprising a manufacturer identifier, a model identifier, and an identifier of a year of manufacture;
   use the second connected television data to determine from the capabilities data structure that the second connected television does not natively provide ARIA functionality;
   select the updated master set of code; and
   cause the updated master set of code to be downloaded to the second connected television.

2. The system as defined in claim 1, wherein the selected version of the code, comprising the subset of the interpreter code included in the master set of code that is configured to provide the connected television with the second subset of ARIA functionality, is configured to interpret one or more ARIA relationship attributes.

3. The system as defined in claim 1, wherein the selected version of the code, comprising the subset of the interpreter code included in the master set of code that is configured to provide the connected television with the second subset of ARIA functionality, is configured to prioritize text-to-speech actions based at least in part on an ARIA-live attribute.

4. The system as defined in claim 1, wherein the selected version of the code, comprising the subset of the interpreter code included in the master set of code that is configured to provide the connected television with the second subset of ARIA functionality, is configured to manage a text-to-speech queue based at least in part on an attribute comprising polite and/or assertive.

5. The system as defined in claim 1, wherein the selected version of the code, comprising the subset of the interpreter code included in the master set of code that is configured to provide the connected television with the second subset of ARIA functionality, wraps all code of a connected television application.

6. The system as defined in claim 1, wherein the selected version of the code, comprising the subset of the interpreter code included in the master set of code that is configured to provide the connected television with the second subset of ARIA functionality, wraps only a subset of code of a connected television application.

7. The system as defined in claim 1, wherein the selected version of the code, comprising the subset of the interpreter code included in the master set of code that is configured to provide the connected television with the second subset of ARIA functionality, is configured to enable assistive voice prompts to be generated that would not be generated via native functionality of the connected television.

8. A computer implemented method, the method comprising:
   determining corresponding levels of built-in ARIA functionality for a plurality of respective televisions of different manufacturers, manufacturer models, and year of manufacture;
   based at least in part on the determined corresponding levels of built-in ARIA functionality for the plurality of respective televisions, generate, from a master set of code, a plurality of versions of code comprising respective subsets of interpreter code that supplies different levels of ARIA functionality included in the master set of code;
   accessing over a network, from a connected television comprising a video codec, connected television data, the connected television data comprising a manufacturer identifier, a model identifier, and/or an identifier of a year of manufacture of the connected television;
   use the connected television data to determine from a data structure that the connected television natively provides a first subset of ARIA functionality and fails to natively provide a second subset of ARIA functionality;

selecting, from a master set of code, a version of code comprising interpreter code configured to provide the connected television with the second subset of ARIA functionality that the connected television is natively lacking; and pushing the selected version of the code, comprising the interpreter code configured to provide the connected television with the second subset of ARIA functionality that the connected television is natively lacking, to be downloaded to the connected television, wherein the selected version of the code is configured to enable the connected television to generate audible announcements corresponding to ARIA attributes;

in response to detecting an update to an ARIA specification, updating the master set of code;

accessing, over the network from a second connected television, second connected television data, the second connected television data comprising a manufacturer identifier, a model identifier, and/or an identifier of a year of manufacture;

using the second connected television data to determine from the data structure that the second connected television does not natively provide a third subset of ARIA functionality;

selecting, from the updated master set of code, a version of code comprising interpreter code configured to provide the second connected television with the third subset of ARIA functionality that the second connected television is natively lacking; and causing the version of code, selected from the updated master set of code comprising interpreter code configured to provide the second connected television with the third subset of ARIA functionality, to be pushed to the second connected television.

9. The computer implemented method as defined in claim 8, wherein the selected version of the code, comprising the interpreter code configured to provide the connected television with the second subset of ARIA functionality that the connected television is natively lacking, is configured to interpret one or more ARIA relationship attributes.

10. The computer implemented method as defined in claim 8, wherein the selected version of the code, comprising the interpreter code configured to provide the connected television with the second subset of ARIA functionality that the connected television is natively lacking, is configured to prioritize text-to-speech actions based at least in part on an ARIA-live attribute.

11. The computer implemented method as defined in claim 8, wherein the selected version of the code, comprising the interpreter code configured to provide the connected television with the second subset of ARIA functionality that the connected television is natively lacking, is configured to manage a text-to-speech queue based at least in part on an attribute comprising polite and/or assertive.

12. The computer implemented method as defined in claim 8, wherein the selected version of the code, comprising the interpreter code configured to provide the connected television with the second subset of ARIA functionality that the connected television is natively lacking, wraps all code of a connected television application.

13. The computer implemented method as defined in claim 8, wherein the selected version of the code, comprising the interpreter code configured to provide the connected television with the second subset of ARIA functionality that the connected television is natively lacking, wraps only a subset of code of a connected television application.

14. The computer implemented method as defined in claim 8, wherein the selected version of the code, comprising the interpreter code configured to provide the connected television with the second subset of ARIA functionality that the connected television is natively lacking, is configured to enable assistive voice prompts to be generated that would not be generated via native functionality of the connected television.

15. Non-transitory computer readable memory having program instructions stored thereon that when executed by a computing device cause the computing device to perform operations comprising:

determining corresponding levels of built-in ARIA functionality for a plurality of respective televisions of different manufacturers, manufacturer models, and year of manufacture;

based at least in part on the determined corresponding levels of built-in ARIA functionality for the plurality of respective televisions, generate, from a master set of code, a plurality of versions of code comprising respective subsets of interpreter code that supplies different levels of ARIA functionality included in the master set of code;

accessing over a network, from a connected device comprising a video codec, connected device data, the connected device data comprising a manufacturer identifier, a model identifier, and/or an identifier of a year of manufacture of the connected device;

use the connected device data to determine from a data structure that the connected device fails to natively provide a subset of screen reader functionality;

selecting, from a master set of code, a version of code comprising interpreter code configured to provide the connected device with the subset of screen reader functionality, in accordance with a specification of attributes and roles, that enable enhanced screen reader functionality that the connected device is natively lacking; and pushing the selected version of the code, comprising the interpreter code configured to provide the connected device with the subset of screen reader functionality that the connected device is natively lacking, to be downloaded to the connected device, wherein the selected version of the code is configured to enable the connected device to generate enhanced audible announcements relative to announcements that the connected device would natively provide;

in response to detecting an update to an ARIA specification, updating the master set of code;

accessing, over the network from a second connected television, second connected television data, the second connected television data comprising a manufacturer identifier, a model identifier, and/or an identifier of a year of manufacture;

using the second connected television data to determine from the data structure that the second connected television does not natively provide a third subset of ARIA functionality;

selecting, from the updated master set of code, a version of code comprising interpreter code configured to provide the second connected television with the third subset of ARIA functionality that the second connected television is natively lacking; and causing the version of code, selected from the updated master set of code comprising interpreter code configured to provide the second connected television with the third subset of ARIA functionality, to be downloaded to the second connected television.

16. The non-transitory computer readable memory as defined in claim 15, wherein the selected version of the code, comprising the interpreter code configured to provide the connected device with the subset of screen reader functionality in accordance with the specification of attributes and roles that enable enhanced screen reader functionality that the connected device is natively lacking, is configured to interpret one or more relationship attributes.

17. The non-transitory computer readable memory as defined in claim 15, wherein the selected version of the code, comprising the interpreter code configured to provide the connected device with the subset of screen reader functionality in accordance with the specification of attributes and roles that enable enhanced screen reader functionality that the connected device is natively lacking, is configured to prioritize text-to-speech actions based at least in part on a live attribute.

18. The non-transitory computer readable memory as defined in claim 15, wherein the selected version of the code, comprising the interpreter code configured to provide the connected device with the subset of screen reader functionality in accordance with the specification of attributes and roles that enable enhanced screen reader functionality that the connected device is natively lacking, is configured to manage a text-to-speech queue based at least in part on an attribute comprising polite and/or assertive.

19. The non-transitory computer readable memory as defined in claim 15, wherein the selected version of the code, comprising the interpreter code configured to provide the connected device with the subset of screen reader functionality in accordance with the specification of attributes and roles that enable enhanced screen reader functionality that the connected device is natively lacking, wraps all code of a connected device application.

20. The non-transitory computer readable memory as defined in claim 15, wherein the selected version of the code, comprising the interpreter code configured to provide the connected device with the subset of screen reader functionality in accordance with the specification of attributes and roles that enable enhanced screen reader functionality that the connected device is natively lacking, wraps only a subset of code of a connected device application.

21. The non-transitory computer readable memory as defined in claim 15, wherein the selected version of the code, comprising the interpreter code configured to provide the connected device with the subset of screen reader functionality in accordance with the specification of attributes and roles that enable enhanced screen reader functionality that the connected device is natively lacking, is configured to enable assistive voice prompts to be generated that would not be generated via native functionality of the connected device.

\* \* \* \* \*